US008285959B2

(12) United States Patent
Jess

(10) Patent No.: US 8,285,959 B2
(45) Date of Patent: Oct. 9, 2012

(54) METHOD FOR PLACEMENT OF VIRTUAL VOLUME HOT-SPOTS IN STORAGE POOLS USING ONGOING LOAD MEASUREMENTS AND RANKING

(75) Inventor: Martin Jess, Erie, CO (US)

(73) Assignee: Netapp, Inc., Sunnyvale, CA (US)

( * ) Notice: Subject to any disclaimer, the term of this patent is extended or adjusted under 35 U.S.C. 154(b) by 335 days.

(21) Appl. No.: 12/692,838

(22) Filed: Jan. 25, 2010

(65) Prior Publication Data

US 2011/0185120 A1  Jul. 28, 2011

(51) Int. Cl.
*G06F 12/02* (2006.01)
(52) U.S. Cl. ............... 711/165; 711/117; 711/E12.016
(58) Field of Classification Search .................. None
See application file for complete search history.

(56) References Cited

U.S. PATENT DOCUMENTS

| | | | |
|---|---|---|---|
| 6,032,224 A * | 2/2000 | Blumenau | 711/117 |
| 6,948,032 B2 | 9/2005 | Kadambi et al. | |
| 2006/0206603 A1 | 9/2006 | Rajan et al. | |
| 2008/0168228 A1* | 7/2008 | Carr et al. | 711/117 |

OTHER PUBLICATIONS

Jess, Martin, U.S. Appl. No. 12/551,593, "A Method for Implementing Continuous Data Protection Utilizing Allocate-On-Write Snapshots", filed Sep. 1, 2009, not yet published.

* cited by examiner

*Primary Examiner* — Edward Dudek, Jr.
*Assistant Examiner* — Ralph A Verderamo, III
(74) *Attorney, Agent, or Firm* — Haynes and Boone, LLP

(57) ABSTRACT

The present invention is directed to a method for providing data element placement in a storage system via a Dynamic Storage Tiering (DST) mechanism, such that improved system efficiency is promoted. For example, the DST mechanism may implement an algorithm for providing data element placement. The data elements (ex.—virtual volume hot-spots) may be placed into storage pools, such that usage of higher performing storage pools is maximized. Hot-spots may be detected by dynamically measuring load on LBA ranges. Performance of the storage pools may be measured on an ongoing basis. Further, the hot-spots may be ranked according to load, while storage pools may be ranked according to measured performance. If a hot-spot's load decreases, the hot-spot may be moved to a lower performing storage pool. If a hot-spot's load increases, the hot-spot may be moved to a higher performing storage pool.

20 Claims, 3 Drawing Sheets

METHOD FOR PLACEMENT OF VIRTUAL VOLUME HOT-SPOTS IN STORAGE POOLS USING ONGOING LOAD MEASUREMENTS AND RANKING

CROSS-REFERENCE TO RELATED APPLICATIONS

U.S. patent application Ser. No. 12/551,593 entitled: A Method for Implementing Continuous Data Protection Utilizing Allocate-On-Write Snapshots, filed Sep. 1, 2009 (pending) is hereby incorporated by reference in its entirety herein.

FIELD OF THE INVENTION

The present invention relates to the field of data management via data storage systems and particularly to a method for placement of virtual volume hot-spots into storage pools using ongoing load measurements and ranking.

BACKGROUND OF THE INVENTION

Currently available methods for providing data management in data storage systems may not provide a desired level of performance.

Therefore, it may be desirable to provide a method(s) for providing data management in a data storage system which addresses the above-referenced shortcomings of currently available solutions.

SUMMARY OF THE INVENTION

Accordingly, an embodiment of the present invention is directed to a method for providing data element placement in a storage system via a Dynamic Storage Tiering (DST) mechanism, said method including: organizing a plurality of storage pools of the storage system into a hierarchy based on relative performance levels of the storage pools; placing a plurality of data elements into the plurality of storage pools based on relative activity levels of the data elements; monitoring the plurality of data elements and the plurality of storage pools of a storage system; determining a load of a first data element included in the plurality of data elements; determining a load range for a first storage pool included in the plurality of storage pools, the first data element being located in the first storage pool, the first storage pool having a first performance level; comparing the load of the first data element to the load range of the first storage pool; when said comparing of the load of the first data element to the load range of the first storage pool indicates that the load of the first data element is larger than an upper threshold of the load range of the first storage pool, determining a load range for a second storage pool included in the plurality of storage pools, the second storage pool having a second performance level, the second performance level being higher than the first performance level; comparing the load of the first data element to the load range of the second storage pool; when said comparing of the load of the first data element to the load range of the second data pool indicates that the load of the first data element is within the load range of the second storage pool, evaluating data element movement criteria to determine if said first data element is cleared to be moved, wherein the evaluated data element movement criteria includes at least one of: free capacity of the second storage pool; level of misfit between the first data element and the first storage pool relative to a pre-determined level of misfit standard; total load on the storage system; number of active DST move operations for the storage system; size of the first data element; and policy restrictions of the storage system; and when said evaluating of said data element movement criteria indicates that the first data element is cleared to be moved, moving said first data element to the second storage pool.

A further embodiment of the present invention is directed to a computer program product comprising: a signal bearing medium bearing: computer-usable code configured for organizing a plurality of storage pools of the storage system into a hierarchy based on relative performance levels of the storage pools; computer-usable code configured for placing a plurality of data elements into the plurality of storage pools based on relative activity levels of the data elements; computer-usable code configured for monitoring the plurality of data elements and the plurality of storage pools of a storage system; computer-usable code configured for determining a load of a first data element included in the plurality of data elements; computer-usable code configured for determining a load range for a first storage pool included in the plurality of storage pools, the first data element being located in the first storage pool, the first storage pool having a first performance level; computer-usable code configured for comparing the load of the first data element to the load range of the first storage pool; computer-usable code configured for, when said comparing of the load of the first data element to the load range of the first storage pool indicates that the load of the first data element is larger than an upper threshold of the load range of the first storage pool, determining a load range for a second storage pool included in the plurality of storage pools, the second storage pool having a second performance level, the second performance level being higher than the first performance level; computer-usable code configured for comparing the load of the first data element to the load range of the second storage pool; computer-usable code configured for, when said comparing of the load of the first data element to the load range of the second data pool indicates that the load of the first data element is within the load range of the second storage pool, evaluating data element movement criteria to determine if said first data element is cleared to be moved, wherein the evaluated data element movement criteria includes at least one of: free capacity of the second storage pool; level of misfit between the first data element and the first storage pool relative to a pre-determined level of misfit standard; total load on the storage system; number of active DST move operations for the storage system; size of the first data element; and policy restrictions of the storage system; and computer-usable code configured for, when said evaluating of said data element movement criteria indicates that the first data element is cleared to be moved, moving said first data element to the second storage pool.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figure(s) in which.

DETAILED DESCRIPTION OF THE INVENTION

Figure 1A:
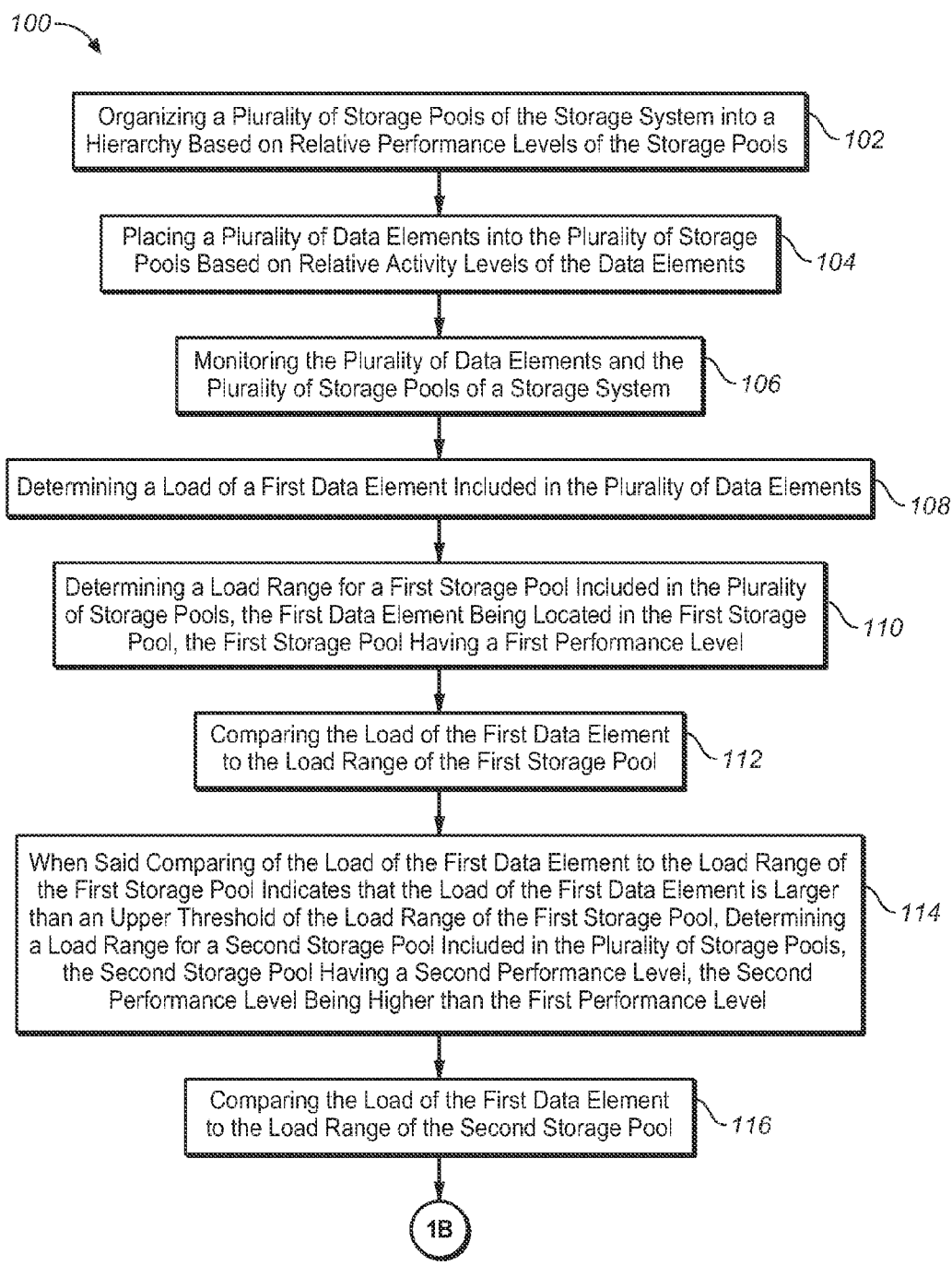
FIGS. 1A and 1B depict a flow chart illustrating a method for providing data element placement in a storage system via a Dynamic Storage Tiering (DST) mechanism (ex.—via an algorithm) in accordance with a further exemplary embodiment of the present invention.

Reference will now be made in detail to the presently preferred embodiments of the invention, examples of which are illustrated in the accompanying drawings.

Dynamic Storage Tiering (DST) is the concept of grouping storage devices of a storage system into tiers based upon their characteristics, and relocating data dynamically to leverage specific capabilities of the storage devices. Such relocating requires that the data be classified in a manner that allows a DST mechanism to place particular elements of the data in their optimal tiers. DST may apply to several different Quality of Service (QoS) attributes of a storage tier. In the present invention, DST-based performance management of a storage system is described.

For performance management, the objective of the DST mechanism of the present invention is to identify data that has a high activity level and place it into high performance storage tiers (ex.—high performance storage pools). It is equally important to identify low activity level data (ex.—data having a lesser activity level than the high activity level data) and to place it into low performance storage tiers (ex.—low performance storage pools), the low performance storage tiers having a lesser level of performance than the high performance storage tiers. Placing the low activity level data in the low performance storage tiers prevents the low activity level data from taking up storage capacity in the high performance storage tiers. The DST mechanism may be able to perform such data identification and placement without taking any host data offline.

Further, the DST mechanism of the present invention may promote maximizing usage of high performance storage tiers in order to maximize utilization of the typically more expensive storage devices (ex.—high performance storage devices) in the high performance storage tiers. However, the DST mechanism may be configured to promote prevention of overloading the high performance tiers and driving their effective performance below that of the low performance tiers. Such overloading may occur when the storage devices in the high performance tiers are saturated (ex.—the storage capacity of the storage devices in the high performance tiers is saturated).

The DST mechanism of the present invention allows for continuous placing and keeping of data elements in their proper storage tiers for optimizing storage system performance. Prior solutions have been unable to provide the above-referenced functionality of the DST mechanism of the present invention. A number of prior solutions are based on the theoretical assumption that I/O behavior may be predicted with a high degree of accuracy. However, highly accurate prediction of I/O behavior has proven to be much more difficult in practice. Other prior solutions may require highly advanced statistical calculation capabilities. A challenging aspect of DST is that, in some instances, moving a data element to a first storage tier (ex.—a high performance storage tier) can change that storage tier's performance level to such a degree that the effective performance/performance level of the storage tier may drop below the effective performance/performance level(s) of a second storage tier (ex.—a low performance/lower performance storage tier). Although measuring storage tier performance on an ongoing basis allows for this aspect/issue to be detected after moving the data to the first storage tier, such issue may not be easily predicted before the move.

In an external storage array (ex.—in a storage system), each Small Computer System Interface (SCSI) Logical Unit (LU) may be mapped to a virtual volume when a Storage Virtualization Manager (SVM) is deployed in the storage array. The virtual volume is provisioned from capacity in one or more storage tiers (ex.—storage pools) of the storage array. For instance, each storage pool may essentially correspond to a storage tier. A storage pool may include one or more virtual drives (ex.—Redundant Array of Inexpensive Disks (RAID) volumes). When the virtual volume is provisioned from the one or more storage pools, a virtual volume segment may be created for each mapping of a virtual volume Logical Block Address (LBA) range to a virtual drive LBA range. Thus, the set of virtual volume segments comprising the virtual volume may form the virtual volume configuration.

For a SCSI LU, data measured as having a high activity level may be identified as a LBA range within the LU. For example, the high activity level data associated with the identified LBA range may have significant activity compared to the rest of the LU, and may be referred to as a hot-spot. An LU may contain more than one hot-spot. This measured activity level of the data may also be referred to as the load on the LBA range.

A hot-spot may be completely contained within a virtual volume segment, or it may span two or more virtual volume segments. Thus, one approach to meeting DST objectives may be to move the virtual volume segment(s) which contain the hot-spot to a higher performing storage pool (ex.—to a high performance storage tier). However, although a virtual volume segment may be smaller than the virtual volume, it may still be very large and the hot-spot may only take up a small percentage of the virtual volume segment(s) which are to be moved. The DST mechanism of the present invention may allow for a hot-spot to be identified. The DST mechanism of the present invention may further allow for the virtual volume configuration (ex.—the virtual volume segments) to be changed dynamically, so that the hot-spot may then be contained in one or more smaller virtual volume segments which are not much larger than the hot-spot. The DST mechanism of the present invention may subsequently move these smaller virtual volume segment(s) containing the hot-spot to the proper storage pools based on an algorithm implemented in/by the DST mechanism of the present invention.

A hot-spot detection mechanism may organize a virtual volume's LBA range into same-sized clusters for which the storage system may measure load/activity on an ongoing basis. For instance, performance statistics (ex.—load measurements) may be collected for each individual cluster. A cluster(s) may be defined either as a percentage of the overall virtual volume capacity, or as a fixed size (ex.—some number of megabytes (MBs)). The storage system may have a minimum cluster size to limit the amount of metadata/statistics that need to be tracked. However, cluster size may normally be considerably smaller than the virtual volume segments. Hot-spots may be identified via a single cluster or adjacent clusters having a high level of activity compared to the rest of the virtual volume (and as compared perhaps to other virtual volumes under DST management. The virtual volume configuration may then be changed so that the clusters corresponding to the hot-spot are in one or more virtual volume segments, thereby allowing the DST mechanism to move much smaller clusters.

The SVM of the storage system may support a snapshot mechanism where one or several Point-in-Time (PiT) copies may be created for a virtual volume. When a PiT copy (ex.—a PiT) is created on a virtual volume, the virtual volume may be frozen and a PiT Temporary Virtual Volume (PTVV) may be created which holds all changes made to the virtual volume after the PiT was created. Consequently, the original contents of the virtual volume may be preserved at the time the PiT was created. This type of snapshot mechanism may be referred to as allocate-on-write (or re-direct-on-write) instead of the more common copy-on-write snapshot mechanism. If another PiT (ex.—a second PiT) is created after the creation of the first PiT, the PTVV of the first PiT (ex.—the current PTVV) may be frozen and a new PTVV (ex.—PTVV of the second PiT) may be created. The most recently created PiT (ex.—the second PiT) may then, upon being created, become the active PiT. The system may be configured such that all writes are directed to the PTVV of the active PiT.

The virtual volume LBA range may be conceptually divided into same sized chunks. The size of a chunk may be the PiT granularity, which is an attribute of the virtual volume. A Re-allocation Table (RT) containing an entry for each chunk in the virtual volume may be created for each PiT and stored in the beginning of the PTVV. When a chunk is written by a host after the PiT has been created, the corresponding entry in the RT for the active PiT is marked as allocated and the chunk is placed in the PTVV at the next available LBA. When a PiT is deleted, the chunks in the corresponding PTVV of the deleted PiT are reintegrated into a previous PiT, or, if there are no other PiTs, then into the virtual volume itself. When a read I/O operation is received on a virtual volume, the RT for the active PiT may always point to the most recent version of that chunk (ex.—the valid chunk). The valid chunk may be/may be located in the PTVV for the active PiT itself, or it may be/may be located in a PTVV for an older PiT, or it may be/may be located in the original volume.

A read hot-spot may be defined as a hot-spot where the majority of I/O operations are reads. A write hot-spot may be defined as a hot-spot where the majority of I/O operations are writes. If a hot-spot is a write hot-spot, the I/O activity may be concentrated in the PTVV for the active (ex.—most recently created) PiT. The hot-spot may be moved to a destination storage pool simply by creating a new PiT for the virtual volume in the destination storage pool. The write I/O activity may continue to be concentrated in the active PiT, which at this point would reside in the destination storage pool. If the hot-spot cools off (ex.—its activity level drops), DST may simply delete the PiT, thus reintegrating the contents of the deleted PiT with the most recent previously created PiT/PTVV, thereby making said most recent previously created PiT/PTVV active again.

If the hot-spot is a read hot-spot, matters may be more complicated as the LBA range in question may be distributed over multiple PiTs associated with the virtual volume. Thus, creating a new PiT in the destination storage pool may not help. Even if the read hot-spot is contained within a single PiT, the chunk LBA ranges cannot be expected to be consecutive in the PTVV (ex.—the chunks that constitute the read hot-spot may be spread all over the PTVV). The PTVV itself may be very large in some cases, so it may not be feasible to move the entire PTVV to the destination storage pool. For read hot-spots, DST (ex.—the DST mechanism) may still create a new PiT in the destination storage pool as described above, but it may also perform the additional step of copying the LBA range comprising the read hot-spot to the new PTVV in the destination storage pool. This may result in placing all of the chunks corresponding to the read hot-spot in the PTVV in the destination storage pool. Thus, when reads are received on the hot-spot in the virtual volume, they will go to the chunks in the PTVV in the destination storage pool (ex.—the faster storage pool).

It is critical to avoid overwriting any host written chunks in the new PTTV (ex.—destination PTVV) during the above-referenced copy process. DST cannot simply write all chunks in the hot-spot LBA range to the destination PTVV, as this may overwrite data the host may have written in the same LBA range while the copy process was taking place. Consequently, the read-hot spot is moved to the destination storage pool using a process termed a PiT additive copy in which chunks within the read hot-spot LBA range are only copied from the source to the destination PTVV if there is not a chunk in the destination PTVV already. Thus, the DST has mechanisms to detect and move hot-spots to other storage pools regardless of whether the virtual volume has PiTs or not and regardless of whether the hot-spot is a read hot-spot or a write hot-spot.

In exemplary embodiments of the present invention, the DST mechanism of the present invention may implement a DST placement algorithm, which may use heuristics for determining which storage pool of a storage system to place each hot-spot into. A first heuristic included in these heuristics may be to maximize utilization of the high performance storage pools (ex.—the higher performing storage pools) of the storage system. This first heuristic may be rooted in the assumption that the higher performing storage pools may include the most expensive/more expensive storage devices of the system and that a user of the system would want to have the highest possible utilization of these higher performing storage pools. Further, a higher utilization of these higher performing (ex.—faster) storage pools may significantly increase the performance that the storage system appears to have overall. For instance, by implementing/following said first heuristic, it may seem as if all of the storage devices of the storage system are of the more expensive type (ex.—are devices of the type included in the higher/highest performing storage pools) when in fact they are not.

In further embodiments of the present invention, based on this first heuristic, the DST mechanism (ex.—DST placement algorithm) may place hot-spots into storage pools in descending order of storage pool performance ranking (ex.—from the top down/from the highest performing to the lowest performing). For instance, the highest ranked storage pool (ex.—the highest performing storage pool) may be filled first, the second highest ranked storage pool may be filled second, the third highest ranked storage pool may be filled third, etc. Further, DST (ex.—the DST placement algorithm) may attempt to maintain the following condition:

Condition 1: For every hot-spot-i and hot-spot-j, if rank(storage-pool(hot-spot-i))<rank(storage-pool (hot-spot-j)) then load(hot-spot-i)<load(hot-spot-j)

According to the above, if Condition 1 is maintained, when the performance rank/level of a storage pool which contains a first hot-spot (ex.—hot-spot-i) is a lower ranking than the performance ranking of a storage pool which contains a second hot-spot (ex.—hot-spot-j), then the load of the first hot-spot (ex.—hot-spot-i) will be less than the load of the second hot-spot (ex.—hot-spot-j). Thus, when Condition 1 is maintained, hot-spots having greater activity levels/loads will be placed into higher performing storage pools than those hot-spots having lower activity levels/loads.

In exemplary embodiments of the present invention, each storage pool may be associated with an upper load threshold and a lower load threshold. The upper load threshold for a storage pool may be defined as/may be equivalent to the load of the hot-spot with the highest load in that storage pool. The lower load threshold for the storage pool may be defined as/may be equivalent to the load of the hot-spot with the lowest load in that storage pool. For example:

Definition 1: If storage-pool(hot-spot-i)=storage-pool(hot-spot-j)=SP AND there exists an i such that load(hot-spot-i)<load(hot-spot-j) for every hot-spot-j in SP where i!=j then lower-threshold(SP)=load(hot-spot-i)

Definition 2: If storage-pool(hot-spot-i)=storage-pool(hot-spot-j)=SP AND there exists a k such that load(hot-spot-k)>load(hot-spot-j) for every hot-spot-j in SP where k!=j then upper-threshold(SP)=load(hot-spot-k)

In further embodiments of the present invention, DST may try to avoid overlapping storage pool thresholds. For example, the DST may try to place hot-spots in storage pools in a manner which maintains the following condition:

Condition 2: If rank(SPn)>rank(SPm) then lower-threshold(SPn)>upper-threshold(SPm)

According to the above, when the system has a first storage pool (SPn) and a second storage pool (SPm), and the performance ranking of the first storage pool is higher than the performance ranking of the second storage pool, Condition 2 will be maintained when the lower threshold of the first storage pool is greater than the upper threshold of the second storage pool.

In exemplary embodiments of the present invention, DST may continuously search for the hot-spot that is the most out-of-range relative to that hot-spot's current storage pool. Once a hot-spot is identified which is consistently out-of-range with that hot-spot's current storage pool, DST may evaluate if it is possible to move the hot-spot to a storage pool where the hot-spot would fit. In current embodiments of the present invention, a number of factors may be considered when making said evaluation. First, DST may identify a prospective destination pool for the hot-spot being evaluated. For example, the prospective destination pool may be a storage pool such that the load of the hot-spot being evaluated is a value that falls within the upper and lower thresholds (or matches the upper or lower threshold values) of the prospective destination pool. Further, the DST may compare the size of the evaluated hot-spot against a storage capacity of the prospective destination pool to determine if the prospective destination pool has sufficient capacity to receive the hot-spot being evaluated.

In further embodiments, DST may evaluate the discrepancy of fit between a hot-spot and its current storage pool. For example, DST may identify the load on the hot-spot and compare that load to the upper and lower thresholds of the hot-spot's current storage pool. Such comparison may provide a determination of how "bad" the misfit currently is between the hot-spot and its current storage pool. Such misfit must be larger than a minimum difference in order for DST to consider moving the hot-spot. Said minimum difference may be a pre-determined or pre-configured minimum difference used by the system for determining whether or not to move a hot-spot being evaluated. Other factors or criteria which may be considered/other determinations which may be made by the DST mechanism of the present invention when evaluating whether or not it is possible (ex.—advisable) to move a hot-spot to a different storage pool may include: determining the current load on the storage system (ex.—the overall storage system); determining Central Processing Unit (CPU) utilization for the storage system; determining bandwidth utilization for the storage system; determining the number of running background operations for the storage system; determining how many DST hot-spot move operations are already running/active; determining the size of the hot-spot to be moved (ex.—since larger hot-spots may take longer to move, if two hot-spots being evaluated for possibly being moved have similar loads, DST may elect to move the smaller of the two prospective hot-spots first); determining if there are any policy restrictions which may prohibit the move (ex.— the pre-staging of a named configuration of data elements over the storage pools). If DST determines that, based upon evaluation against the above-listed criteria, a hot-spot being analyzed for a potential move does not meet the criteria and that said hot-spot should not be moved at that time, DST may select a next element (ex.—a next hot-spot) from a DST-configured list of prospective hot-spots which do not fit their current storage pools and may evaluate the next hot-spot against the above-listed criteria, and so forth. DST may continuously update the list of prospective hot-spots which do not fit their current storage pools and may continue to move through the list at periodic intervals to evaluate/re-evaluate hot-spots against the above-listed criteria to determine if they can and/or should be moved to different storage pools.

In exemplary embodiments of the present invention, the DST mechanism may be configured such that, when a hot-spot has been previously moved by DST, it may not be moved again unless the hot-spot's load changes significantly. In order to avoid thrashing, a grace time period may be imposed on a hot-spot that has just been moved. For instance, unless the hot-spot's load changes significantly within that grace time period, it may be ineligible for being moved again. Further, after the grace time period expires, the hot-spot is ineligible for being moved back to a storage pool it came from unless the load of that hot-spot has changed significantly since being previously moved.

In further embodiments of the present invention, when a hot-spot cools off (ex.—when the load of the hot-spot decreases below the lower threshold of its storage pool) said hot-spot may eventually be moved to a lower ranked storage pool or it may even be moved back to the storage pool containing the rest of its virtual volume (ex.—the hot-spot may be re-integrated back into its virtual volume. Such moving of the cooled off hot-spot out of the higher ranked storage pool may free up capacity in the higher ranked storage pool for new hot-spot(s) which have higher loads.

In exemplary embodiments of the present invention, DST may detect a new hot-spot, which may be suitable for placement in a first storage pool (SPn). However, the first storage pool may not have enough free capacity left to hold the new hot-spot. In such case, DST may move other hot-spot(s) from the first storage pool (SPn) to lower ranked storage pools to free up capacity for the new hot-spot. This may be the case if DST can find one or more hot-spots in the first storage pool (SPn) which have a lower load than the new hot-spot and whose combined capacity is equal to or higher than what is required by the new hot-spot.

As mentioned above, DST may continuously monitor storage pool performance and, if the average response time performance of a higher ranked storage pool drops too close to the next lower ranked storage pool (ex.—within some pre-configured percentage of the next lower ranked storage pool), then the higher ranked pool may become ineligible for receiving more hot-spots unless other hot-spots are moved out of the higher ranked storage pool. In current embodiments of the present invention, it may be the case that the higher ranked storage pool is ineligible, but there is a first hot-spot (ex.— hot-spot-i) in the higher ranked storage pool which has a lower load than a second hot-spot (ex.—hot-spot-j), which is about to be moved by DST. Thus, moving the second hot-spot to a lower performing storage pool would violate Condition 1 above. In this case, hot-spot-I is moved first to the next lower performing storage pool if the following conditions are true: a) moving the first hot-spot (ex.—hot-spot-i) frees up enough capacity in the higher performing storage pool for the second hot-spot (ex.—hot-spot-j); and b) there is enough free capacity in the next lower performing storage pool for the second hot-spot. If both of these conditions (ex.—conditions a and b) are met, the first hot-spot may be moved to the next lower performing storage pool, and then the second hot-spot may be moved to the higher performing storage pool. If both of these conditions (conditions a and b) are not met for any hot-spot in the higher performing storage pool, then the second hot-spot may be moved to the next lower performing storage pool and DST may record and/or provide an indication/notification that there is a violation of the above condition(s) (conditions a and b). Such violation may be later resolved as configuration of the storage system may change.

In further embodiments of the present invention, if DST detects multiple hot-spots that need to be moved, it may select the hot-spot having the highest absolute load and move it first. Then, if DST determines that it needs to move other hot-spots to lower ranked storage pools in order to free up capacity for the selected hot-spot (ex.—the hot-spot having the highest absolute load), such other move operations are considered part of the overall operation to place the selected hot-spot (ex.—the higher/highest load hot-spot).

In exemplary embodiments, DST may move an entire virtual volume to a lower ranked pool in order to create/free-up capacity in a higher ranked storage pool for hot-spots. This may be the case if: there are no hot-spot move operations in the queue or running; there is enough free capacity in the lower ranked storage pool, and the average load on the virtual volume minus any hot-spots fits within the lower ranked pool (ex.—falls within the upper and lower threshold of the lower ranked pool without pushing those to overlap with any neighboring storage pools).

Thus, the DST mechanism of the present invention may perform the following functions for the storage system: detection of hot-spots by measuring load on LBA ranges; measurement of performance of storage pools on an ongoing basis; ranking of hot-spots based upon the relative loads of the hot-spots; ranking of storage pools based upon their measured performance; placement of hot-spots into storage pools from the top down (ex.—into higher performing storage pools first); and movement of hot-spots to lower ranked storage pools if the hot-spot cools off.

Further, the DST mechanism of the present invention may provide the following advantages: the algorithm implemented when providing DST/the DST mechanism is simple to implement and prototype; the DST mechanism doesn't consume excessive CPU cycles on the system; maximizes the utilization of higher performing storage pools; automatically adjusts to changing load conditions on the system.

Figure 1B:
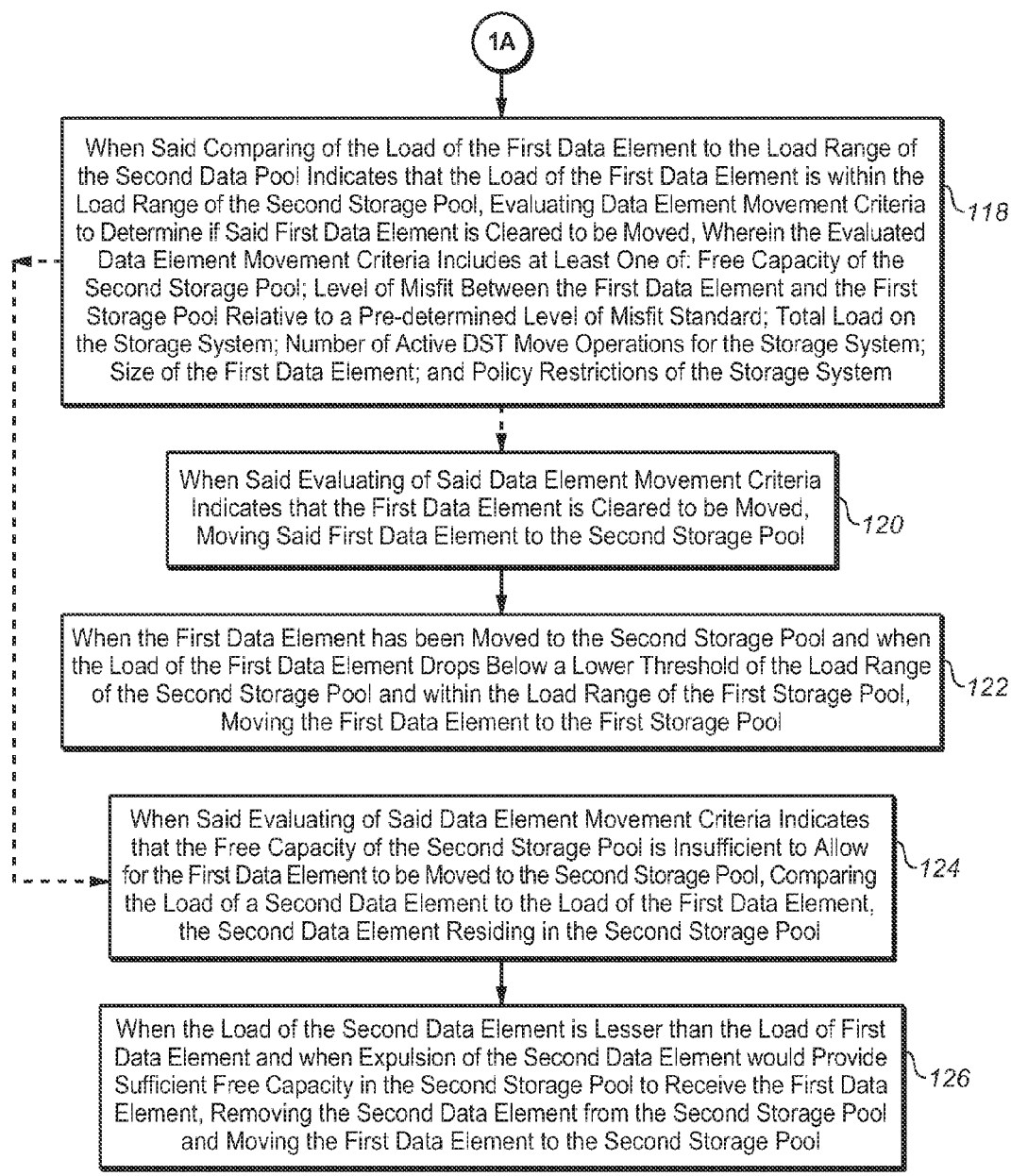
Figure 2:
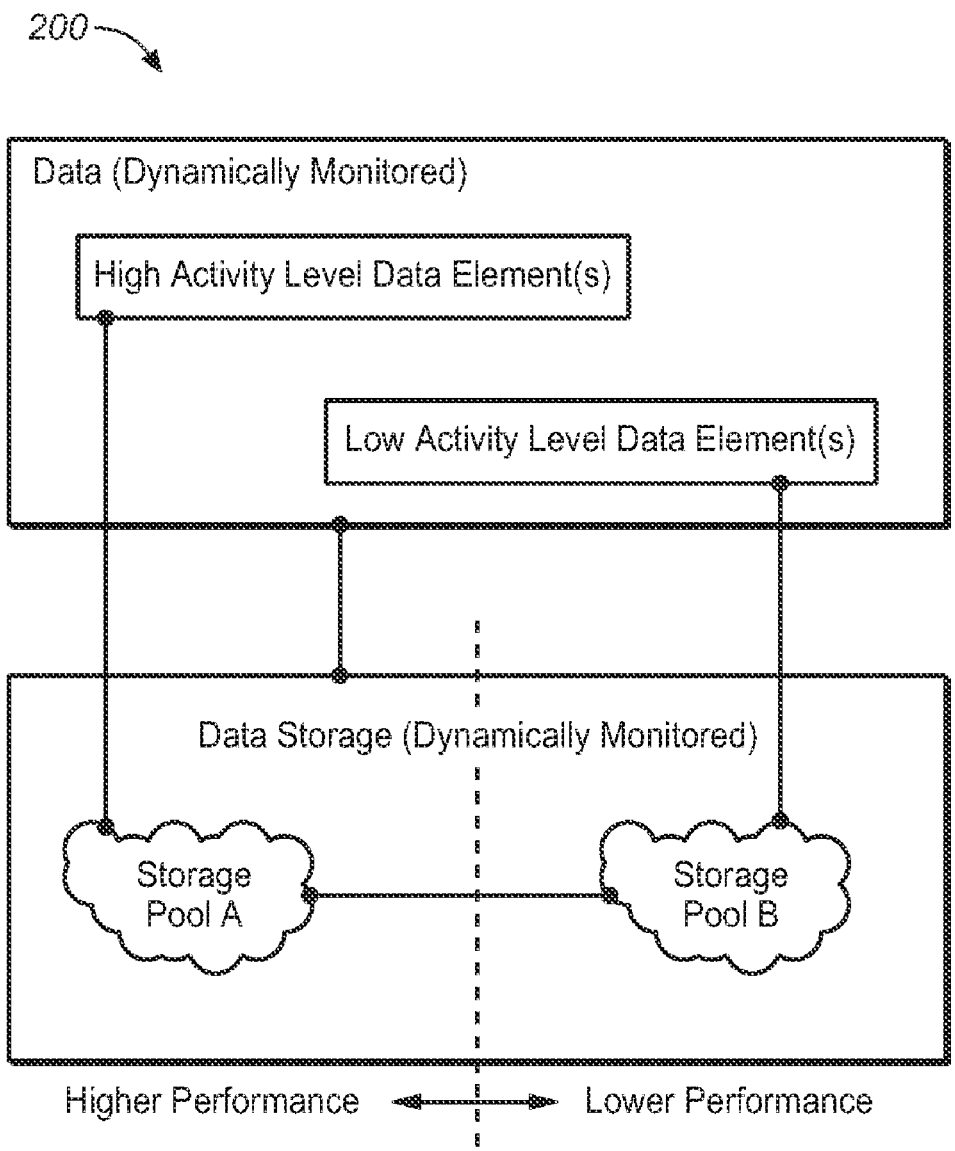
FIG. 2 is a block diagram illustration of a system (ex.—storage system) upon/within which the method(s) for providing data element placement of the present invention (ex.—such as the method shown in FIGS. 1A and 1B) may be implemented, in accordance with an exemplary embodiment(s) of the present invention.

In FIGS. 1A and 1B, a flowchart is provided which illustrates a method for providing data element placement in a storage system (ex.—such as the system 200, shown in FIG. 2) via a Dynamic Storage Tiering (DST) mechanism (ex.—via an algorithm) in accordance with an exemplary embodiment of the present invention. The method 100 may include organizing a plurality of storage pools of the storage system into a hierarchy based on relative performance levels (ex.—average response time performance) of the storage pools 102. The method 100 may further include placing a plurality of data elements into the plurality of storage pools based on relative activity levels of the data elements 104. The method 100 may further include monitoring the plurality of data elements and the plurality of storage pools of a storage system 106. The method 100 may further include determining a load of a first data element included in the plurality of data elements 108.

In further embodiments of the present invention, the method 100 may further include determining a load range for a first storage pool included in the plurality of storage pools, the first data element being located in the first storage pool, the first storage pool having a first performance level 110. The method may further include comparing the load of the first data element to the load range of the first storage pool 112. The method 100 may further include, when said comparing of the load of the first data element to the load range of the first storage pool indicates that the load of the first data element is larger than an upper threshold of the load range (ex.—upper load threshold) of the first storage pool, determining a load range for a second storage pool included in the plurality of storage pools, the second storage pool having a second performance level, the second performance level being higher than the first performance level 114. The method 100 may further include comparing the load of the first data element to the load range of the second storage pool 116.

In exemplary embodiments of the present invention, the method 100 may further include, when said comparing of the load of the first data element to the load range of the second data pool indicates that the load of the first data element is within the load range of the second storage pool, evaluating data element movement criteria to determine if said first data element is cleared to be moved, wherein the evaluated data element movement criteria includes at least one of: free capacity of the second storage pool; level of misfit between the first data element and the first storage pool (ex.—how far outside of the load range of the first storage pool) relative to a pre-determined level of misfit standard (ex.—relative to a pre-established/configured minimum difference required for the data element to be considered for movement); total load on the storage system; number of active DST move operations for the storage system; size of the first data element; and policy restrictions of the storage system 118. The method 100 may further include, when said evaluating of said data element movement criteria indicates that the first data element is cleared to be moved, moving said first data element to the second storage pool 120. The method 100 may further include, when the first data element has been moved to the second storage pool and when the load of the first data element drops below a lower threshold of the load range of the second storage pool and within the load range of the first storage pool, moving the first data element to the first storage pool 122.

In further embodiments of the present invention, the method 100 may further include, when said evaluating of said data element movement criteria indicates that the free capacity of the second storage pool is insufficient to allow for the first data element to be moved to the second storage pool, comparing the load of a second data element to the load of the first data element, the second data element residing in the second storage pool 124. The method 100 may further include, when the load of the second data element is lesser than the load of first data element and when expulsion of the second data element would provide sufficient free capacity in the second storage pool to receive the first data element, removing the second data element from the second storage pool and moving the first data element to the second storage pool 126.

It is to be noted that the foregoing described embodiments according to the present invention may be conveniently implemented using conventional general purpose digital computers programmed according to the teachings of the present specification, as will be apparent to those skilled in the computer art. Appropriate software coding may readily be prepared by skilled programmers based on the teachings of the present disclosure, as will be apparent to those skilled in the software art.

It is to be understood that the present invention may be conveniently implemented in forms of a software package. Such a software package may be a computer program product which employs a computer-readable storage medium including stored computer code which is used to program a computer to perform the disclosed function and process of the present invention. The computer-readable medium/computer-readable storage medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for providing data element placement in a storage system via a Dynamic Storage Tiering (DST) mechanism, said method comprising:
    organizing a plurality of storage pools of the storage system into a hierarchy based on relative performance levels of the storage pools;
    placing a plurality of data elements into the plurality of storage pools based on relative activity levels of the data elements;
    monitoring the plurality of data elements and the plurality of storage pools of the storage system;
    determining a load of a first data element included in the plurality of data elements;
    using the load of the first data element to determine a level of misfit between the first data element and a first storage pool; and
    comparing the level of misfit with a misfit standard.

2. A method as claimed in claim 1, further comprising: determining a load range for a first storage pool included in the plurality of storage pools, the first data element being located in the first storage pool, the first storage pool having a first performance level.

3. A method as claimed in claim 2, further comprising: comparing the load of the first data element to the load range of the first storage pool.

4. A method as claimed in claim 3, further comprising: when said comparing of the load of the first data element to the load range of the first storage pool indicates that the load of the first data element is larger than an upper threshold of the load range of the first storage pool, determining a load range for a second storage pool included in the plurality of storage pools, the second storage pool having a second performance level, the second performance level being higher than the first performance level.

5. A method as claimed in claim 4, further comprising: comparing the load of the first data element to the load range of the second storage pool.

6. A method as claimed in claim 5, further comprising: when said comparing of the load of the first data element to the load range of the second data pool indicates that the load of the first data element is within the load range of the second storage pool, evaluating data element movement criteria to determine if said first data element is cleared to be moved, wherein the evaluated data element movement criteria includes at least one of: free capacity of the second storage pool; the level of misfit between the first data element and the first storage pool relative to the misfit standard; total load on the storage system; number of active DST move operations for the storage system; size of the first data element; and policy restrictions of the storage system.

7. A method as claimed in claim 6, further comprising: when said evaluating of said data element movement criteria indicates that the first data element is cleared to be moved, moving said first data element to the second storage pool.

8. A method as claimed in claim 7, further comprising: when the first data element has been moved to the second storage pool and when the load of the first data element drops below a lower threshold of the load range of the second storage pool and within the load range of the first storage pool, moving the first data element to the first storage pool.

9. A method as claimed in claim 6, further comprising: when said evaluating of said data element movement criteria indicates that the free capacity of the second storage pool is insufficient to allow for the first data element to be moved to the second storage pool, comparing the load of a second data element to the load of the first data element, the second data element residing in the second storage pool.

10. A method as claimed in claim 9, further comprising: when the load of the second data element is lesser than the load of first data element and when expulsion of the second data element would provide sufficient free capacity in the second storage pool to receive the first data element, removing the second data element from the second storage pool and moving the first data element to the second storage pool.

11. A computer program product comprising:
a computer readable non-transitory medium bearing:
    computer-usable code configured for organizing a plurality of storage pools of a storage system into a hierarchy based on relative performance levels of the storage pools;
    computer-usable code configured for placing a plurality of data elements into the plurality of storage pools based on relative activity levels of the data elements;
    computer-usable code configured for monitoring the plurality of data elements and the plurality of storage pools of the storage system;
    computer-usable code configured for determining a load of a first data element included in the plurality of data elements;

computer-usable code configured for determining a level of misfit between the first data element and a first storage pool using the load of the first data element; and comparing the level of misfit with a misfit standard.

12. A computer program product as claimed in claim 11, the computer readable non-transitory medium further bearing:

computer-usable code configured for determining a load range for a first storage pool included in the plurality of storage pools, the first data element being located in the first storage pool, the first storage pool having a first performance level; and computer-usable code configured for comparing the load of the first data element to the load range of the first storage pool.

13. A computer program product as claimed in claim 12, the computer readable non-transitory medium further bearing:

computer-usable code configured for, when said comparing of the load of the first data element to the load range of the first storage pool indicates that the load of the first data element is larger than an upper threshold of the load range of the first storage pool, determining a load range for a second storage pool included in the plurality of storage pools, the second storage pool having a second performance level, the second performance level being higher than the first performance level;

computer-usable code configured for comparing the load of the first data element to the load range of the second storage pool; and computer-usable code configured for, when said comparing of the load of the first data element to the load range of the second data pool indicates that the load of the first data element is within the load range of the second storage pool, evaluating data element movement criteria to determine if said first data element is cleared to be moved, wherein the evaluated data element movement criteria includes at least one of: free capacity of the second storage pool; the level of misfit between the first data element and the first storage pool relative to the misfit standard; total load on the storage system; number of active DST move operations for the storage system; size of the first data element; and policy restrictions of the storage system.

14. A computer program product as claimed in claim 13, the computer readable non-transitory medium further bearing:

computer-usable code configured for, when said evaluating of said data element movement criteria indicates that the first data element is cleared to be moved, moving said first data element to the second storage pool; and computer-usable code configured for, when the first data element has been moved to the second storage pool and when the load of the first data element drops below a lower threshold of the load range of the second storage pool and within the load range of the first storage pool, moving the first data element to the first storage pool.

15. A computer program product as claimed in claim 13, the computer readable non-transitory medium further bearing:

computer-usable code configured for, when said evaluating of said data element movement criteria indicates that the free capacity of the second storage pool is insufficient to allow for the first data element to be moved to the second storage pool, comparing the load of a second data element to the load of the first data element, the second data element residing in the second storage pool; and computer-usable code configured for, when the load of the second data element is lesser than the load of first data element and when expulsion of the second data element would provide sufficient free capacity in the second storage pool to receive the first data element, removing the second data element from the second storage pool and moving the first data element to the second storage pool.

16. A method for providing data element placement in a storage system via a Dynamic Storage Tiering (DST) algorithm, said method comprising:

organizing a plurality of storage pools of the storage system into a hierarchy based on relative performance levels of the storage pools;

placing a plurality of data elements into the plurality of storage pools based on relative activity levels of the data elements;

monitoring the plurality of data elements and the plurality of storage pools of the storage system;

determining a load of a first data element included in the plurality of data elements; and determining a load range for a first storage pool included in the plurality of storage pools, the first data element being located in the first storage pool, the first storage pool having a first performance level;

using the load of the first data element to determine a level of misfit between the first data element and the first storage pool; and comparing the level of misfit with a misfit standard.

17. A method as claimed in claim 16, further comprising:

comparing the load of the first data element to the load range of the first storage pool;

when said comparing of the load of the first data element to the load range of the first storage pool indicates that the load of the first data element is larger than an upper threshold of the load range of the first storage pool, determining a load range for a second storage pool included in the plurality of storage pools, the second storage pool having a second performance level, the second performance level being higher than the first performance level;

comparing the load of the first data element to the load range of the second storage pool;

when said comparing of the load of the first data element to the load range of the second data pool indicates that the load of the first data element is within the load range of the second storage pool, evaluating data element movement criteria to determine if said first data element is cleared to be moved, wherein the evaluated data element movement criteria includes at least one of: free capacity of the second storage pool; the level of misfit between the first data element and the first storage pool relative to the misfit standard; total load on the storage system; number of active DST move operations for the storage system; size of the first data element; and policy restrictions of the storage system.

18. A method as claimed in claim 17, further comprising:

when said evaluating of said data element movement criteria indicates that the first data element is cleared to be moved, moving said first data element to the second storage pool; and when the first data element has been moved to the second storage pool and when the load of the first data element drops below a lower threshold of the load range of the second storage pool and within the load range of the first storage pool, moving the first data element to the first storage pool.

19. A method as claimed in claim 17, further comprising:
when said evaluating of said data element movement criteria indicates that the free capacity of the second storage pool is insufficient to allow for the first data element to be moved to the second storage pool, comparing the load of a second data element to the load of the first data element, the second data element residing in the second storage pool.

20. A method as claimed in claim 19, further comprising:
when the load of the second data element is lesser than the load of first data element and when expulsion of the second data element would provide sufficient free capacity in the second storage pool to receive the first data element, removing the second data element from the second storage pool and moving the first data element to the second storage pool.

* * * * *